Aug. 5, 1958          H. P. HOVNANIAN ET AL          2,846,597
              LEAKAGE FLUX COMPENSATING COIL
Filed April 2, 1954                        3 Sheets-Sheet 1

INVENTORS
H. PHILIP HOVNANIAN
RUSSELL D. ZIMMER
BY
Davis, Hoxie & Faithfull
ATTORNEYS Aug. 5, 1958  H. P. HOVNANIAN ET AL  2,846,597
LEAKAGE FLUX COMPENSATING COIL
Filed April 2, 1954  3 Sheets-Sheet 2

INVENTORS
H. PHILIP HOVNANIAN
RUSSELL D. ZIMMER
BY
Davis, Hoxie & Faithfull
ATTORNEYS Aug. 5, 1958  H. P. HOVNANIAN ET AL  2,846,597
LEAKAGE FLUX COMPENSATING COIL
Filed April 2, 1954  3 Sheets-Sheet 3
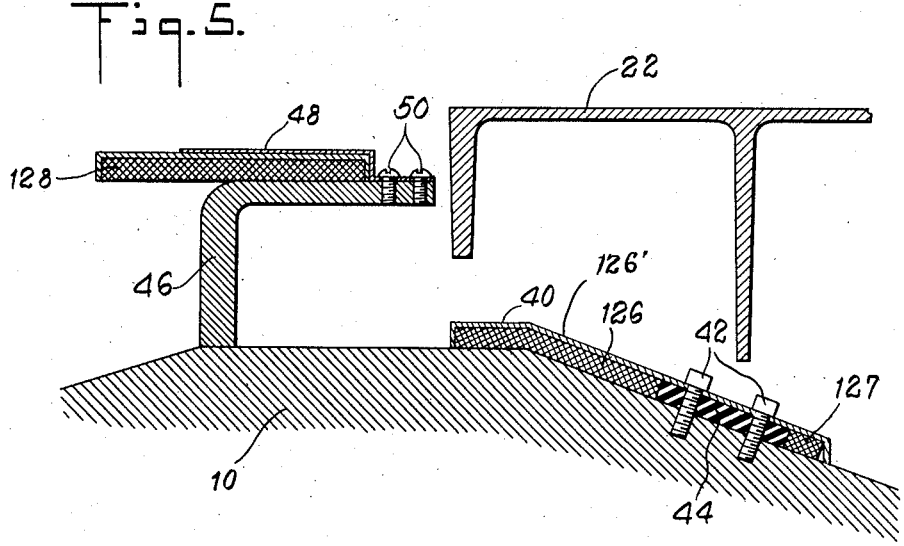
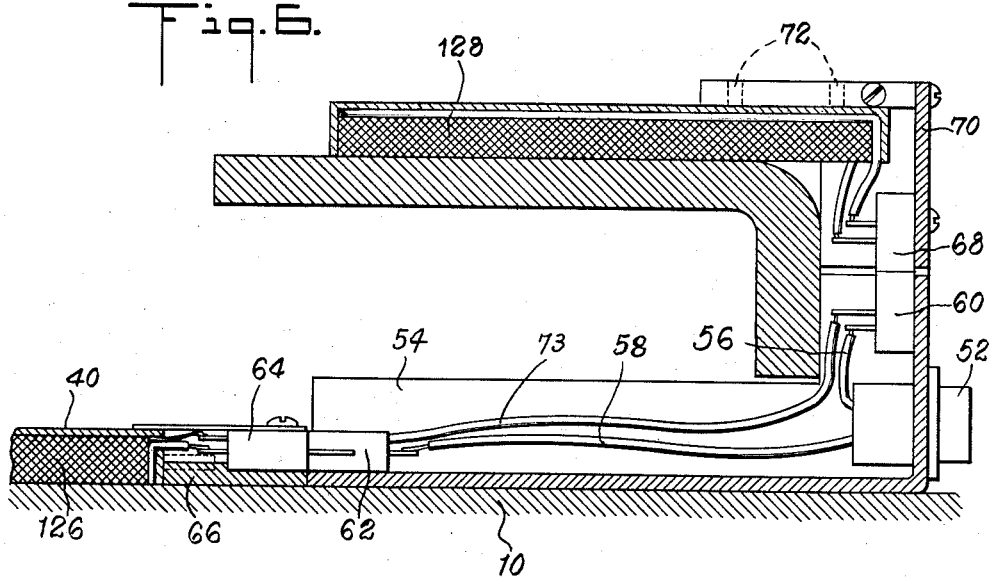
INVENTORS
H. PHILIP HOVNANIAN
RUSSELL D. ZIMMER
BY
Davis, Hoxie & Faithfull
ATTORNEYS

United States Patent Office 2,846,597
Patented Aug. 5, 1958

2,846,597

LEAKAGE FLUX COMPENSATING COIL

Hrair Philip Hovnanian and Russell D. Zimmer, Winchester, Mass., assignors, by mesne assignments, to The Calidyne Company, Inc., a corporation of Massachusetts Application April 2, 1954, Serial No. 420,518

5 Claims. (Cl. 310—27)

In the vibration testing of various mechanical and electrical devices and structures by means of an electromagnetic vibration generator, one of the difficulties encountered is the shielding of the devices being tested from the leakage flux from the air gap and other portions of the core structure of the vibration generator. One manner of shielding is described in United States Letters Patent No. 2,599,036 to Efromson and Lewis wherein the table carrying the test sample or load is located at the opposite end of the core structure from the air gap so that the iron of the core structure acts as a shield and the stray flux in the vicinity of the test table is minimized. Although the magnitude of the reduction in the leakage flux obtained adjacent the table is satisfactory for many testing purposes, the residue leakage flux is sufficiently great to affect adversely the operation of delicate magnetic instruments and electronic circuits under test conditions.

It is accordingly the principal objects of the present invention to provide reciprocating test apparatus which provides a greatly reduced leakage flux in the vicinity of the test table, which does not interfere with the normal test procedures, which can be adapted for use with existing apparatus, and which advances the testing art generally.

According to the present invention the vibration producing apparatus or generator comprises a core structure having a direct current winding for producing a uni-directional flux across an air gap. Reciprocally disposed in the air gap is an alternating current winding of an armature which imparts a reciprocating movement to a test load, for example by means of a table which carries the load or by other connection or fixture which is in contact with the load, so that the load and armature are vibrated in an axial direction at a frequency corresponding to that of the alternating current in the armature winding. One or more leakage flux compensating coils, preferably coaxially arranged, are interposed between the core structure and the load. Means are provided for electrically interconnecting the ends of the coil or coils with a direct power source to cause a direct current to flow therethrough in a direction to provide a magnetic field which opposes and substantially nullifies the leakage flux from the core structure in the vicinity of the load. To shield the load more adequately from the leakage flux, it is preferable that the diameter of the compensating coil be greater than the outer diameter of the table, in which case the turns of the coil disposed beyond the table periphery may be displaced axially to bring such turns adjacent the plane of the table top. It is also advantageous in many instances to locate the innermost turns of the coil at a distance outwardly from the coil axis so that no reversal of the flux field takes place at the center of the table when the leakage flux at the table periphery is nullified.

These and other objects and aspects of the invention will be apparent from the following description of several specific embodiments of the invention which refers to drawings wherein:

Fig. 5 is a fragmentary sectional view showing the details of the compensating coil mounting; and Fig. 6 is a fragmentary sectional view showing the details of the electrical connections to the compensating coils.

Figure 1:
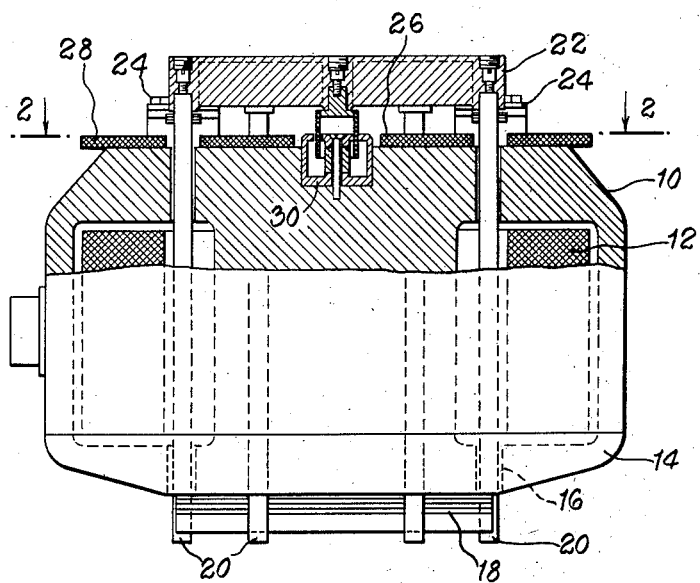
Fig. 1 is a side elevation view in partial section of a first embodiment of the invention.
Figure 2:
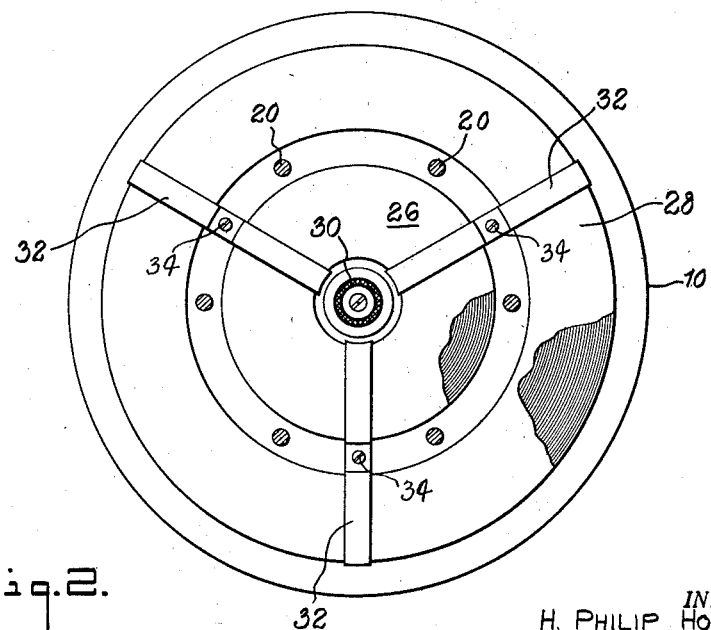
Fig. 2 is a sectional view on line 2—2 of Fig. 1.

The first embodiment of the invention illustrated in Figs. 1 and 2 comprises a soft iron core structure 10 which is generally E-shaped in cross section to accommodate a direct current winding 12. The magnetic circuit of the core structure 10 is completed through an annular cover 14, the cylindrical faces of the cover and the central pole portion of the core structures forming an annular air gap 16. Disposed in the air gap 16 is an alternating current armature winding 18 which is carried upon the lower ends of six equally spaced columns, such as the struts 20. The manner in which the armature winding 18 is secured to the struts 20 and the other details of construction of the armature form no part of the present invention and may be accomplished in a manner similar to that described in detail in United States Letters Patent No. 2,599,036 to Efromson and Lewis, so that these will not be described further other than to say that the struts 20 extend through suitable apertures in the core structure 10 to carry a test table 22 or other load connecting means upon their opposite ends, whereby the mass of iron of the core structure is interposed between the table and air gap 16.

The entire armature assembly is supported to permit reciprocal movement in an axial direction by means of four flexures 24 only two of which are shown. The details of the flexure construction are also available in the aforementioned patent to Efromson and Lewis. With a uni-directional flux across the air gap 16 as a result of the energization of the direct current winding 12, the flow of an alternating current in the armature winding 18 results in an alternating flux which reacts with the uni-directional flux in the well known manner to impart a reciprocating movement to the armature and connected load (not shown), whose frequency corresponds to the frequency of the alternating current in the armature winding.

Although the interposing of the mass of iron of the core structure 10 between the table 22 and the air gap 16 is effective to shield the table and adjacent space from the great part of the flux which escapes from the air gap, such magnetic shielding cannot as a practical matter be 100% effective. And as with all magnetic systems, there is also some stray flux adjacent the iron portions of the magnetic circuit. Although for many test purposes such stray leakage fluxes of the magnitude of those mentioned are for all practical purposes negligible, in other vibration tests, for example, such as of sensitive instruments or relays whose own magnetic circuits may be affected, or of electronic equipment, such as radar systems, which are susceptible to stray magnetic fields, the stray flux from the air gap 16 and from the iron itself give erroneous and undependable test results.

In the present invention such stray leakage flux is counteracted by a magnetic field which is opposite in direction and of approximately the same magnitude as the leakage flux field so that the effects thereof are substantially nullified. This opposing magnetic field is obtained from one or more leakage flux compensation coils which are interposed between the bottom of the test table 22 and the top of the iron core structure 10. In Fig. 1 is shown such a compensating coil 26 wound of an insulated conductor with an axial length short enough so that the coil can be inserted beneath the test table 22. The diameter of the compensating coil must be materially greater than the diameter of the table so as to set up an opposing field in the space over the entire area of the table. To obtain such diameter and at the same time provide an annular aperture through which the struts 20 extend, a second compensating coil 28 having a greater diameter is provided and connected electrically in series with the coil 26, it being understood that the separate coils are used to simplify the mechanical construction, and it is possible to replace the two coils with a single large diameter coil if suitable apertures are provided to permit the struts 20 to project therethrough.

An aperture is provided at the center of the inner coil 26 for the signal generator 30. However, it has been found that even if the signal generator 30 is omitted, the innermost turn of the coil 26 must be of a diameter such as to be at a distance outwardly from the coil axis to prevent a reversal of the magnetic field at the center of the table 12 when the leakage flux at the table periphery is substantially nullified.

As is best shown in Fig. 2, the compensating coils 26 and 28 are held in position by means of three equally spaced straps 32, preferably made of a non-magnetic material, which pass over the top of the coils. Each of the straps 32 is secured to the upper surface of the core structure 10 by a respective cap screw 34 that engages a threaded aperture located in the annular space between the coils for the struts 20. The compensating coils 26 and 28 are energized to produce a uni-directional magnetic field, which is opposite in direction to the stray flux field, by connecting the coils in series with an external source of direct power, such as a motor generator set by means of a conventional connector (not shown). The strength of the compensating field is controlled by varying the current flow through the coils 26 and 28, for example, either by adjustment of the generator output voltage or by the inserting of a control rheostat in series with the coils.

Figure 3:
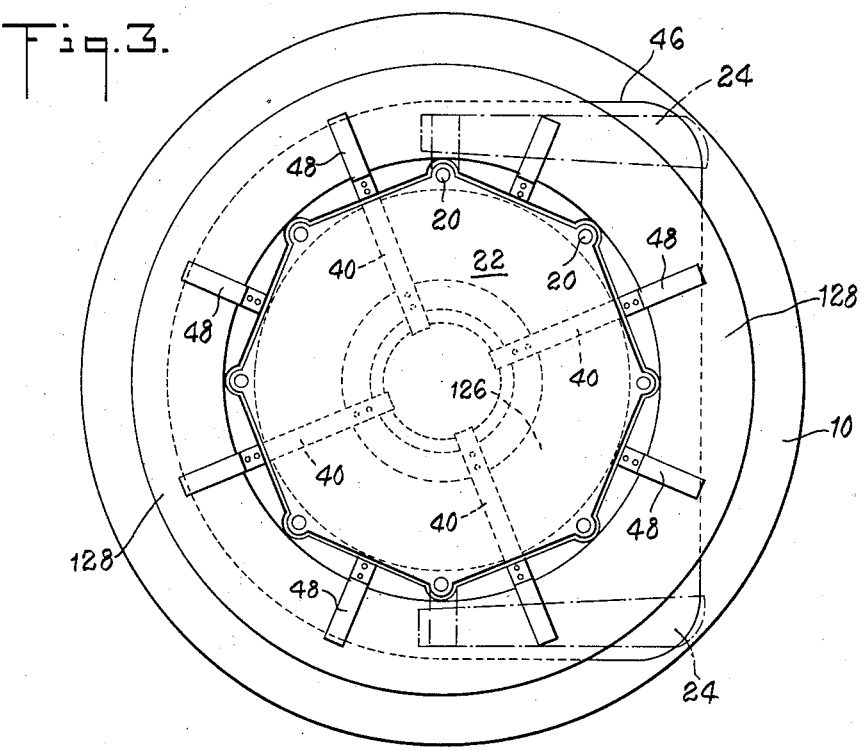
Fig. 3 is a plan view of a second embodiment.
Figure 4:
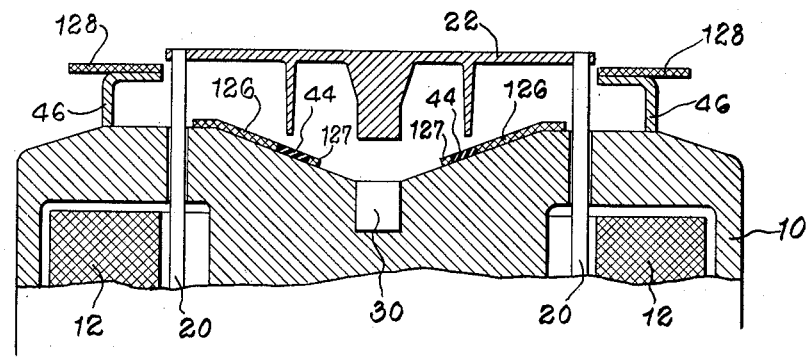
Fig. 4 is a fragmentary sectional view of the second embodiment showing an alternative construction.

In Figs. 3 and 4 is shown a second embodiment of the invention wherein the leakage flux compensating coils lie in different planes. In this embodiment the elements of the vibration generator which are similar to those mentioned above have been given the same indicia and will not be described further. Because of the concave configuration of the top of the core structure 10 of the second embodiment, the inner compensating coil 126 is wound in a corresponding conical shape so as to lie against the top of the core structure. The coil 126 is protected from physical damage by enclosing it in a cover plate 126' which is spun from a soft non-magnetic material such as aluminum. As is best shown in Figs. 3 and 5, the coil 126 is secured to the core structure by four equally spaced straps 40 each of which passes over the top of the coil and is secured by two cap screws 42. The screws 42 pass through a spacer 44 which separates the innermost turns 127 from the remainder of the coil 126.

To provide more effective magnetic shielding of the outer edge of the table 22 and the space thereabove, the outer compensating coil 128 is mounted upon the top of the housing 46 for the upper flexures 24 (Fig. 3), in which position the coil is adjacent the plane of the top surface of the table 22. In the absence of a flexure housing, the coil 128 is similarly positioned by means of suitable brackets (not shown) fastened to the top of the core structure 10. The coil 128 is secured to the top of the housing 46 by eight equally spaced clamping members 48 each of which is fastened to the top of the housing 46 by two cap screws 50.

To provide the compensating magnetic field, the coils 126 and 128 are connected in series and a direct current passed therethrough. It will be apparent that when the coils 126 and 128 are so connected they are the electrical equivalent of a single coil but the invention is not so limited and it is also possible to connect the coils in parallel. Each coil may also be connected to a separate power supply or in series with a separate rheostat so that a different current flows through each of the coils. The innermost turns 127 may also be separately energized to give, in effect, three separate coils.

The means for connecting the coils 126 and 128 to an external direct power supply is illustrated in Fig. 6, wherein a socket 52 which is adapted to engage a mating plug (not shown) on the end of the cable from the power supply is secured to the end of an L-shaped channel member 54. The contacts of the socket 52 are electrically connected with one end of each of the coils 126 and 128, respectively, by means of insulated conductors 56 and 58 which extend between the socket contacts and bayonet connectors 60 and 62 located at the opposite ends of the legs of the channel member. The connector 62 engages a mating connector 64 which is carried by a channel-shaped bracket 66 extending from the outer edge of the coil 126 and is permanently connected to the ends of the coil. Similarly, the connector 60 mates with a connector 68 which is electrically connected to the ends of the compensating coil 128, the connector 68 being supported by the lower end of an L-shaped bracket 70 which is attached to the cover plate of the coil 128 by screws 72. The second contact of the connector 60 is directly connected with the second contact of the connector 62 by a conductor 73 thereby to complete the circuit connecting the coils 126 and 128 in series.

It should be understood that the present disclosure is for the purpose of illustration only and that this invention includes all modifications and equivalents which fall within the scope of the appended claims.

We claim:

1. Apparatus for producing a reciprocating movement in a test load comprising a core structure forming a high permeability flux path having an air gap therein, a direct current field winding for magnetizing the core structure and producing a unidirectional magnetic flux across the air gap, a reciprocally mounted armature having a table for carrying the test load and an alternating current winding disposed in the air gap for imparting a movement thereto, a leakage flux compensaitng coil including a plurality of turns about a core having a permeability of substantially unity, the coil being interposed between the table and the core structure externally the high permeability flux path thereof, the outer turns of the coil having a greater diameter than that of the table being displaced axially with respect to the inner turns, and means for connecting the compensating coil with a direct power source to cause the flow of a direct current through the turns in a direction to establish a magnetic field which substantially nullifies the core structure leakage flux adjacent the table without substantially opposing the flux in the high permeability path of the core structure.

2. Apparatus for producing a reciprocating movement in a test load comprising a core structure forming a high permeability flux path having an air gap therein, a direct current field winding for magnetizing the core structure and producing a unidirectional magnetic flux across the air gap, a reciprocably mounted armature having a table for carrying the test load and an alternating current winding disposed in the air gap for imparting a movement thereto, a leakage flux compensating coil including a plurality of turns about a core having a permeability of substantially unity, the coil being interposed between the table and the core structure externally the high permeability flux path thereof, the outer turns of the coil having a greater diameter than that of the table lying in the plane of the table, the inner turns being displaced axially so that they are disposed between the table and the core structure, and means for connecting the compensating coil with a direct power source to cause the flow of a direct current through the turns in a direction to establish a magnetic field which substantially nullifies the core structure leakage flux adjacent the table without substantially opposing the flux in the high permeability path of the core structure.

3. Apparatus for producing a reciprocating movement in a test load comprising a core structure forming a high permeability flux path having an air gap therein, a direct current field winding for magnetizing the core structure and producing a unidirectional magnetic flux across the air gap, a reciprocally mounted armature having an alternating current winding disposed in the air gap and means for connecting with the test load for imparting a movement thereto, a leakage flux compensating coil including a plurality of turns about a core having a permeability of substantially unity, the coil being interposed between the load and the core structure externally the high permeability flux path thereof, the outer turns of the coil having a greater diameter than that of the armature being displaced axially with respect to the inner turns, and means for connecting the compensating coil with a direct power source to cause the flow of a direct current through the turns in a direction to establish a magnetic field which substantially nullifies the core structure leakage flux adjacent the load without substantially opposing the flux in the high permeability path of the core structure.

4. Apparatus for producing a reciprocating movement in a test load comprising a core structure forming a high permeability flux path having an air gap therein, a direct current field winding for magnetizing the core structure and producing a unidirectional magnetic flux across the air gap, a reciprocally mounted armature having a table for carrying the test load and an alternating current winding disposed in the air gap for imparting a movement thereto, a leakage flux compensating coil including a plurality of turns the innermost of which has a sufficient diameter to form an air core therefor, the coil being interposed between the table and the core structure externally the high permeability flux path thereof, and means for connecting the compensating coil with a direct power source to cause the flow of a direct current through the turns in a direction to establish a magnetic field which substantially nullifies the core structure leakage flux adjacent the table without substantially opposing the flux in the high permeability path of the core structure, the diameter of the air core being great enough to prevent a flux reversal and over-compensation at the center of the table.

5. Apparatus for producing a reciprocating movement in a test load comprising a core structure forming a high permeability flux path having an air gap therein, a direct current field winding for magnetizing the core structure and producing a unidirectional magnetic flux across the air gap, a reciprocally mounted armature having an alternating current winding disposed in the air gap and means for connecting with the test load for imparting a movement thereto, a leakage flux compensating coil including a plurality of turns about a core having a permeability of substantially unity, the coil being interposed between the load and the core structure externally the high permeability flux path thereof, and means for connecting the compensating coil with a direct power source to cause the flow of a direct current through the turns in a direction to establish a magnetic field which substantially nullifies the core structure leaking flux adjacent the load without substantially opposing the flux in the high permeability of the core structure.

References Cited in the file of this patent

UNITED STATES PATENTS

| 608,133 | Kelly | July 26, 1898 |
|---|---|---|
| 2,164,537 | Mead | July 4, 1939 |
| 2,599,036 | Efromson | June 3, 1952 |